Jan. 16, 1968 A. ROTH 3,364,480

BI-DIRECTIONAL DIGITIZER

Filed April 17, 1964

ALBERT ROTH
INVENTOR.

BY Carl R. Brown
ATTORNEY

Jerome B. Rockwood
AGENT

United States Patent Office 3,364,480

Patented Jan. 16, 1968

3,364,480
BI-DIRECTIONAL DIGITIZER

Albert Roth, San Diego, Calif., assignor to General Dynamics Corporation, San Diego, Calif., a corporation of Delaware Filed Apr. 17, 1964, Ser. No. 360,562
8 Claims. (Cl. 340—347)

This invention relates to phase shift digitizers, and more particularly to means for generating a predetermined number of pulses for each predetermined amount of phase deviation between a reference alternating voltage signal and an alternating voltage data signal. Two output lines, one representing a positive direction and the other a negative direction, carry digit representing pulses to a suitable display or control device.

The phase digitizer of this invention divides a fixed frequency reference signal into an integral number of discrete pulses or square waves, each on a separate line. A fixed phase relation is maintained between the signals on each line. The reference signals are thus sampled by the variable frequency data signal. If the frequency of the data signal is lower than that of the reference, each sampling will occur later in phase in the reference cycle than the previous sampling. Thus, the discrete reference signals on each reference line are sampled in a predetermined order. If, on the other hand, the frequency of the data signal is higher than that of the reference signal, the sampling order is reversed.

It is, therefore, an object of this invention to provide a phase digitizer wherein the logic circuits are digital.

Another object of this invention is to provide a phase digitizer having a wide frequency range.

Another object of this invention is to provide a phase digitizer which is compact, reliable, has low power consumption, and is simple and inexpensive to build.

Figure 1:
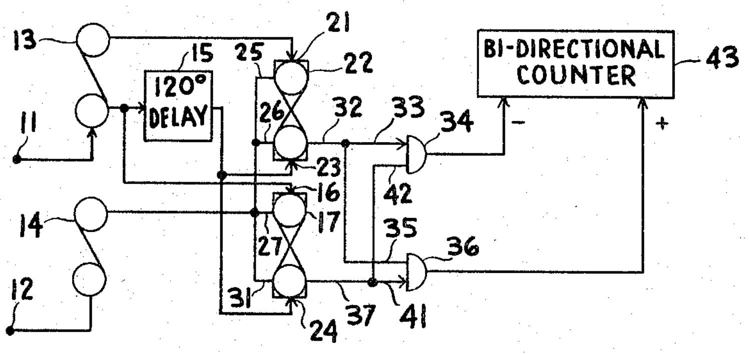
Figure 2:
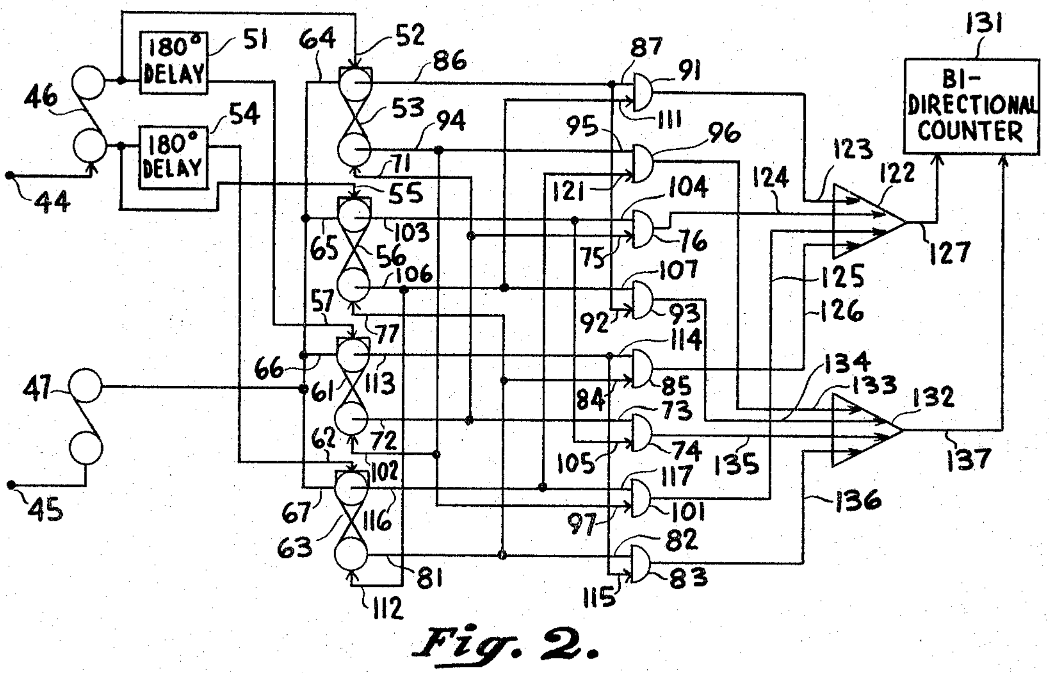

These and other objects and advantages of this invention will become apparent to one skilled in the art from the following description taken in connection with the accompanying drawings, wherein:

FIGURE 1 is a block diagram of a one-pulse-per-cycle embodiment of this invention; and FIGURE 2 is a block diagram of a four-pulse-per-cycle embodiment of this invention.

Referring now to FIGURE 1, a reference signal is applied to input terminal 11, and the data signal to be measured is applied to input terminal 12. The reference and data signals may be sinusoidal waves, square waves, or other form of periodic wave signal. Reference and data signals need not have the same type of waveform.

Reference signal input terminal 11 is connected to a one-shot multivibrator 13. Similarly, data signal terminal 12 is connected to one-shot multivibrator 14. One-shot multivibrators 13 and 14, well known to those skilled in the art, provide constant amplitude, constant width rectangular output pulses when triggered by input signals and may be referred to as wave squaring means. The one-shot multivibrator 13 is connected in part via a delay line 15 to flip-flops and gates which constitute comparing means. The latter means having output lines which go to a bi-directional counter 43, which provides in digitized form, the frequency difference between the reference and data signals.

One side of one-shot multivibrator 13 is connected to delay line 15 and to set pulse input terminal 16 of a gated flip-flop 17. Delay line 15 provides a time delay equal to 120 degrees of the reference signal cycle. The other side of one-shot multivibrator 13 is connected to set pulse input terminal 21 of a gated flip-flop 22 similar to gated flip-flop 17. As is well known to those skilled in the art, gated flip-flops are flip-flop devices which may be triggered by a pulse or by the leading edge of a square wave only in the presence of a control voltage applied to the input gate. A suitable gated flip-flop is disclosed in "Digital Circuit Modules Catalog T72" published July 1962 by Engineered Electronics Company, Santa Ana, California.

The delayed output of delay line 15 is connected to reset pulse input 23 of gated flip-flop 22, and to reset pulse input 24 of gated flip-flop 17. Control inputs 25 and 26 of gated flip-flop 22 and control inputs 27 and 31 of gated flip-flop 17 are connected to the output of data one-shot multivibrator 14.

Output 32 of gated flip-flop 22 is connected to pulse input 33 of pulse "and" gate 34, and to control input 35 of pulse "and" gate 36. Similarly, output 37 of gated flip-flop 17 is connected to pulse input 41 of pulse "and" gate 36 and to control input 42 of pulse "and" gate 34. A pulse "and" gate is a coincidence gate which generates an output pulse when a pulse or the leading edge of a positive-going square wave is applied to the pulse input in coincidence with positive direct voltage level control signals applied to the control inputs. A positive indicating pulse line connects pulse gate 36 to a utilization device such as bidirectional counter 43. Similarly, a negative indicating pulse line connects pulse gate 34 to the utilization device such as bidirectional counter 43.

The embodiment of FIGURE 1 provides one output pulse to bidirectional counter 43 for each cycle of frequency difference between the data signal and the reference signal. In operation, the reference signal applied to terminal 11 is applied to one side of one-shot multivibrator 13. One-shot multivibrator 13 is set to remain in the "one" state for 120 degrees of the reference signal cycle. When triggered by the reference signal, the upper side of one-shot multivibrator 13 goes into the "one" state and remains in that condition for 120 degrees of the reference signal cycle; thus, the term "set input" is applied to identify the inputs 21 and 16 and reset input to identify the inputs 23 and 24. A first output pulse is applied to pulse input 21 of gated flip-flop 22. After 120 degrees of the reference signal cycle, one-shot multivibrator 13 goes into the "zero" state, generating a pulse which is applied to set pulse input 16 of gated flip-flop 17, and to the input of delay line 15. The delayed output pulse from delay line 15 is applied to set pulse inputs 23 and 24.

Each cycle of the reference signal generates three pulses separated from one another by 120 degrees. The data signal is converted into a rectangular wave by one-shot multivibrator 14. Preferably, the "on" period is set to approximately 120 degrees of the data cycle. The rectangular wave is applied as a control signal to gate the trigger inputs 25, 26, 27 and 31 of gated flip-flops 17 and 22. Concidence between the rectangular data wave and the leading edge of the reference signal triggers that flip-flop to which the particular reference line is applied.

If greater resolution is required, the four-pulse-per-cycle digitizer, illustrated schematically by FIGURE 2, may be employed. A reference signal is applied to reference terminal 44, and the data signal is applied to data terminal 45. Reference terminal 44 is connected to one-shot multivibrator 46, and data terminal 45 is connected to one-shot multivibrator 47.

One side of one-shot multivibrator 46 is connected to a 180 degree delay line 51 and to set pulse input 52 of gated flip-flop 53. In a similar manner, the other output side of one-shot multivibrator 46 is connected to 180 degree delay line 54 and to set pulse input 55 of gated flip-flop 56. The delayed output of delay line 51 is connected to set pulse input 57 of gated flip-flop 61, and the delayed output of delay line 54 is connected to set pulse input 62 of gated flip-flop 63.

The output of one-shot multivibrator 47 is connected to control inputs 64, 65, 66 and 67 of gated flip-flops 53, 56, 61 and 63 respectively. Reset pulse input 71 of gated flip-flop 53 is driven from emitter follower output 72 of gated flip-flop 61. Output 72 is also connected to input 73 of "and" gate 74, and to pulse input 75 of "and" gate 76. Reset input 77 of gated flip-flop 56 is driven from emitter follower output 81 of gated flip-flop 63. Output 81 is also connected to input 82 of "and" gate 83, and to input 84 of "and" gate 85.

Emitter follower output 86 of gated flip-flop 53 is connected to input 87 of "and" gate 91, and to pulse input 92 of "and" gate 93. Emitter follower output 94 is connected to input 95 of "and" gate 96, to pulse input 97 of "and" gate 101, and to reset pulse input 102 of gate flip-flop 61. Emitter follower output 103 of gated flip-flop 56 is connected to input 104 of "and" gate 76, and to pulse input 105 of "and" gate 74. Emitter follower output 106 of gated flip-flop 56 is connected to input 107 of "and" gate 93, to pulse input 111 of "and" gate 91, and to pulse input 112 of gated flip-flop 63. Emitter follower output 113 of gated flip-flop 61 is connected to input 114 of "and" gate 85 and to pulse input 115 of "and" gate 83. Similarly, emitter follower output 116 of gated flip-flop 63 is connected to input 117 of "and" gate 101 and to input 121 of "and" gate 96.

A negative count "or" gate 122 has a first input 123 from "and" gate 91, a second input 124 from "and" gate 76, a third input 125 from "and" gate 101, and a fourth input 126 from "and" gate 85. Output 127 from "or" gate 122 is connected to the negative count input of a bidirectional counter 131, of a type well known to the art.

Positive count "or" gate 132 has a first input 133 from "and" gate 96, a second input 134 from "and" gate 93, a third input 135 from "and" gate 74, and a fourth input 136 from "and" gate 83. Output 137 from "or" gate 132 is connected to the positive count input of bidirectional counter 131.

The reference signal applied to one-shot multivibrator 46 is formed thereby into a square wave having an "on" time of one fourth of the reference signal cycle. Thus the leading edges of the square wave output occur at zero degrees and 90 degrees. These are applied directly to set pulse input 52 of gated flip-flop 53 and to set pulse input 55 of gated flip-flop 56, respectively. The zero leading edge is also delayed 180 degrees by delay line 51 and applied to set pulse input 57 of gated flip-flop 61. Similarly, the 90 degree leading edge is delayed an additional 180 degrees by delay line 54 and the resultant 270 degree delayed leading edge is applied to set pulse input 62 of gated flip-flop 63. The data signal output of one shot multivibrator 47 is used as a common gate to control the triggering of all of gated flip-flops 53, 56, 61 and 63.

Whenever coincidence occurs between an "on" signal in the data square wave from one-shot multivibrator 47 and the leading edge of the reference square wave from one-shot multivibrator 46 or delay lines 51 or 54, the corresponding gated flip-flop will be set to the "one" state; thus, explaining the use of the terms "set input" and "reset input" above. Thus, each gated flip-flop, 53, 56, 61 and 63, will be triggered in sequence when the data frequency is lower than the reference frequency. On the other hand, if the data frequency is higher than the reference frequency, the sequence is reversed, gated flip-flop 63 being triggered first, then 61, 56, and finally 53.

Since "one" output 94 of gated flip-flop 53 is connected to reset pulse input 102 of gated flip-flop 61, when gated flip-flop 53 is triggered by inputs 52 and 64, gated flip-flop 61 will be reset to the "zero" state. In a similar manner gated flip-flop 56 will reset gated flip-flop 63, gated flip-flop 61 will reset gated flip-flop 53, and gated flip-flop 63 will reset gated flip-flop 56 when triggered.

The resulting square wave outputs from the gated flip-flops each have a frequency equal to the difference between that of the data and reference frequencies. The four square wave outputs of the gated flip-flops are staggered in time so that the leading and trailing edges each occur in the center of the square wave output of the adjacent gated flip-flop.

When connected in the manner disclosed, each alternate pulse "and" gate provides a pulse output for every 90 degrees of phase change between the reference and data signals. Pulse "and" gate 91 provides an output pulse when input 87 is positive and a positive-going leading edge of a square wave is applied to input 111. This occurs when gated flip-flop 53 is in the "one" state due to application of the positive portion of the reference signal cycle, and gated flip-flop 56 is being reset to the "zero" state due to application of the positive portion of the data signal cycle. Similarly, pulse "and" gate 76 provides an output pulse when input 104 is positive and a positive-going leading edge of a square wave is applied to input 75; gated flip-flop 56 being in the "one" state during the positive portion of the reference signal cycle delayed 90 degrees from the lower portion of one-shot multivibrator 46, and gated flip-flop 63 being reset to the "zero" state by the positive portion of the data signal cycle. Pulse "and" gates 85 and 101 are actuated in order in response to 180 degrees delayed and 270 degrees delayed reference signals.

Output pulses from pulse "and" gates 91, 76, 85 and 101 are applied to pulse "or" gate 122. A pulse on any input generates an output pulse to the down-count input on bidirectional counter 131.

If the data frequency is higher than the reference frequency, the order of actuation of gated flip-flops 53, 56, 61, and 63 is reversed, and pulse "and" gates 96, 93 74 and 83 will conduct pulses actuating "or" gate 132 and providing input pulses in the up-count input of bidirectional counter 131.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A frequency difference digitizer for digitizing the frequency difference between a reference signal and a data signal, said digitizer comprising (a) means responsive to said reference signal for providing a plurality of reference pulses displaced in phase from one another during each cycle of said reference signal, (b) means responsive to said data signal for providing pulses in each cycle thereof which have durations about equal to the interval between successive ones of said reference pulses, (c) comparing means responsive to said data pulses and said reference pulses and including, (i) a plurality of flip-flops, (ii) means for applying data pulses to said flip-flops for enabling them to be conditioned into at least one of said states.

(iii) means for applying said reference pulses to said flip-flops for conditioning them into at least said one state and, (iv) a plurality of gate circuits each adapted to be enabled and triggered respectively by different ones of said flip-flops to produce an output, and (d) first and second output lines coupled to different ones of said gate circuits whereby said first output line carries pulses representing a reference signal frequency higher than said data signal frequency and said second output line carries pulses representing a reference signal frequency lower than said data signal frequency.

2. The invention as set forth in claim 1 wherein said means for providing said reference pulses includes a one-shot multivibrator for producing a pair of said reference pulses separated by a predetermined delay time, and a delay line having a delay time equal to said predetermined delay time and being responsive to at least one of said pair of reference pulses.

3. The invention as set forth in claim 1 wherein said flip-flops are gated flip-flops having pulse inputs for receiving said reference pulses and control inputs for receiving said data pulses.

4. The invention as set forth in claim 2 wherein said means for providing said data pulses includes another one-shot multivibrator for producing said data pulses having a duration equal to said predetermined delay time.

5. The invention as set forth in claim 1 including a bi-directional counter having an up count input terminal connected to said first output line and a down input terminal connected to said second output line.

6. The invention as set forth in claim 4 wherein said predetermined delay time is a time interval equal to 120° of a cycle of said reference signals wherein said delay line is connected to the output of said one-shot multivibrator which produces the second of said pair of reference pulses.

7. A frequency difference digitizer for obtaining a digital number corresponding to the frequency difference between a reference signal and a data signal, said digitizer comprising a first wave squaring one shot multivibrator, means for applying said reference signal to said first one shot multivibrator, first and second 180 degree delay lines connected to said first one shot multivibrator, said first one shot multivibrator and said first and second delay lines providing four rectangular reference signals displaced 90 degrees in phase from one another, a second wave squaring one shot multivibrator for converting said data signal into a rectangular data wave means for applying said data signal to said second one-shot multivibrator, a first pulse output line, a second pulse output line, comparing means having input terminals connected to said first one shot multivibrator, to said first and second delay lines and to said second one shot multivibrator and first and second output terminals connected to said first pulse output line and to said second pulse output line respectively, said comparing means including a plurality of gated flip-flops connected to said input terminals, a plurality of "and" gates having input terminals connected to said gated flip-flops, a first comparing means output terminal and a second comparing means output terminal being connected to said output terminals of different groups of said "and" gates, whereby said first output line carries pulses representing a reference signal frequency higher than said data signal frequency and said second output line carries pulses representing a reference signal frequency lower than said data signal frequency, and a bi-directional counter connected to said first output line and to said second output line.

8. A frequency difference digitizer for obtaining a digital number corresponding to the frequency difference between a reference signal and a data signal, said digitizer comprising a first wave squaring one shot multivibrator, means for applying said reference signal to said first one shot multivibrator, first and second 180 degree delay lines connected to said first one shot multivibrator, said first one shot multivibrator and said first and second delay lines providing four rectangular reference signals displaced 90 degrees in phase from one another, a second wave squaring one shot multivibrator for converting said data signal into a rectangular data wave means for applying said data signal to said second one-shot multivibrator, a first pulse output line, a second pulse output line, comparing means having input terminals connected to said first one shot multivibrator, to said first and second delay lines and to said second one shot multivibrator, output terminals connected to said first pulse output line and to said second pulse output line, said comparing means including four gated flip-flops connected to said input terminals, eight "and" gates each having input terminals connected to two of said gated flip-flops, first and second "or" gates, each connected to different groups of four of said "and" gates, means connecting said first "or" gate to said first pulse output line, and means connecting said second "or" gate to said second output line whereby said first output line carries pulses representing a reference signal frequency higher than said data signal frequency and said second output line carries pulses representing a reference signal frequency lower than said data signal frequency, and a bi-directional counter connected to said first output line and to said second output line.

References Cited

UNITED STATES PATENTS 3,028,589 4/1962 Broadwell ---------- 340—347

MAYNARD R. WILBUR, *Primary Examiner.*

J. H. WALLACE, *Assistant Examiner.*